Nov. 21, 1950     B. J. BECKWITH     2,531,102
WHEEL GAUGE

Filed Nov. 14, 1947     2 Sheets-Sheet 1

*INVENTOR.*
Bernard J. Beckwith
BY Robert U. Geib, Jr.
Attorney

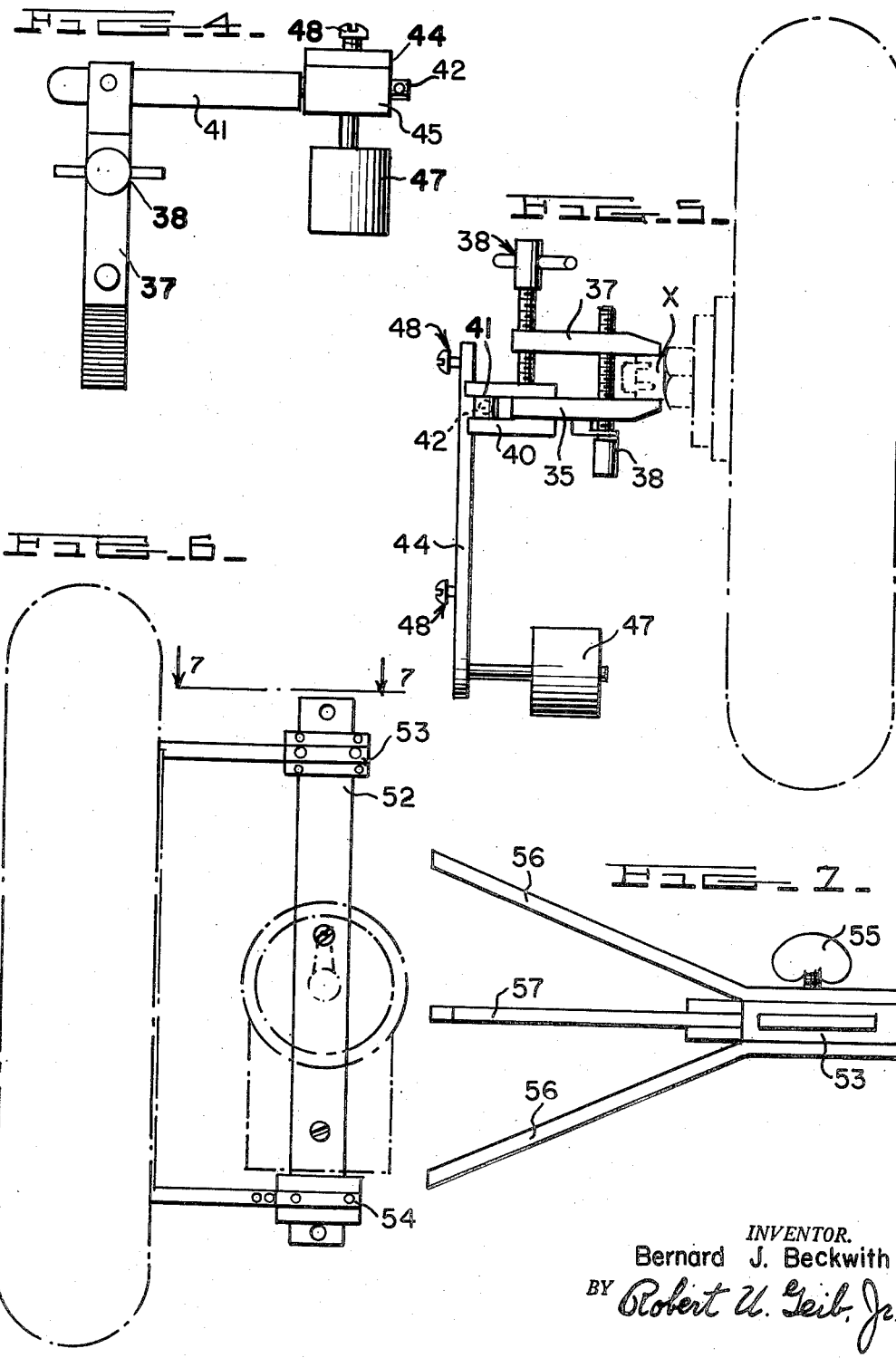

Patented Nov. 21, 1950

2,531,102

UNITED STATES PATENT OFFICE 2,531,102

WHEEL GAUGE

Bernard J. Beckwith, Lake Village, Ind.

Application November 14, 1947, Serial No. 786,071

4 Claims. (Cl. 33—214)

This invention relates to gauges and more particularly to gauges which are used for measuring the inclined angles of the front wheels of motor vehicles and the like, these inclined angles being known as caster, camber and kingpin inclination.

It is among the objects of the present invention to provide a gauge of the type described which may be used to determine the aforesaid inclined angles with extreme accuracy and efficiency, whether the system of suspending the wheel be of the type wherein a pin passes through the ends of the front axle of the vehicle or of the type wherein the ends of the front axle employ independent springing which is controlled by arms or brackets.

Another object is the provision of a novel single gauge which may be used in several different ways and/or positions, and in each instance be easily and speedily operated to obtain the desired measurement.

Still another object is the attainment of the foregoing objectives by the use of a combination of elements which is easy and inexpensive to manufacture and one which is at the same time very durable in service.

The foregoing and further objects will be apparent from the following specification when taken with the accompanying drawing in which:

Figure 4 is a plan of a novel means for supporting the gauge in an operative position;

Figure 5 is a side elevation of the supporting means of Figure 4 as attached to the wheel nut on the outer end of the spindle body of the front-end of a motor vehicle;

Figure 6 is an elevation of another means for supporting the gauge of the invention, the said means being adapted to contact and align with the outer face of the rim of the wheel of the vehicle; and Figure 7 is an enlarged fragmentary plan on the line 7—7 of Figure 6.

Figure 1:
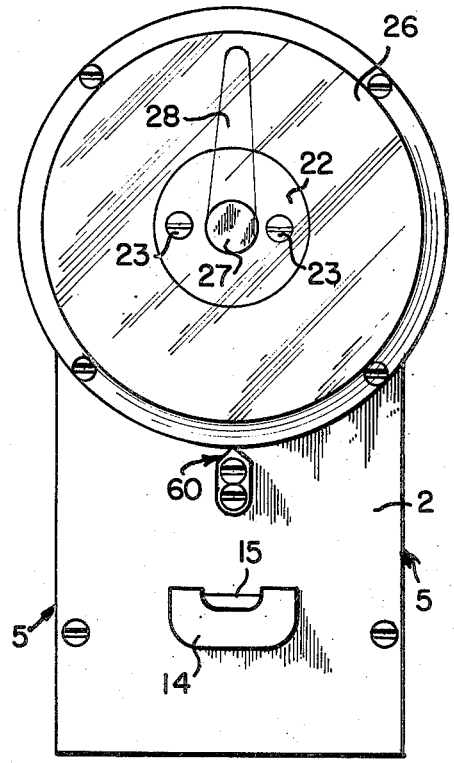
Figure 1 is a front elevation of the novel gauge of the present invention.
Figure 2:
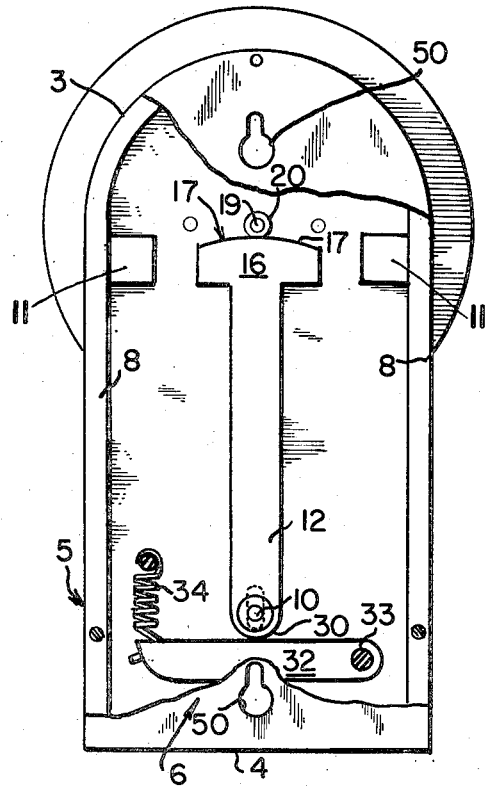
Figure 2 is a rear elevation of the showing of Figure 1 with the back plate of the gauge broken away.

Referring more particularly to the drawings, the numeral 2 designates a front plate forming part of the gauge of the invention, the said plate being relatively flat and provided with a curved upper portion 3 and a substantially straight lower portion, the outer ends of the curved upper portion 3 and the substantially straight lower portion 4 being connected by substantially straight and parallel sides 5. Immediately behind the front plate 2 is a back plate 6 which is of a shape and size which corresponds with the front plate 2. The front and back plates 2 and 6 are assembled with an intermediately disposed spacer element 8 which is of inverted U-shape thereby providing a convexly curved upper end and a pair of straight and substantially parallel leg members which extend downwardly to the lower ends of the front and back plates (2 and 6). These front and back plates, and the intermediately disposed spacer element 8, are secured together in any suitable manner, as by means of countersunk machine screws, pins, etc.; and the spacer element may be further held in position by means of inwardly disposed contacting spacer blocks 11 which are secured to either the front plate 2 and/or the back plate 6.

A rotatable pin 10 (see Figure 3) extends through and projects from both sides of the plate 2; and to the inner end of the said pin there is secured the lower end of a vertically extending lever 12. For reasons which will appear more fully hereinafter, the rotatable pin 10 is journaled at each end in short slots in plates 2 and 6 which slots extend vertically, thereby permitting the said pin to move slightly in a vertical direction. A rocking block 14 is secured to the outer end of the rotatable pin 10, and in the top of this rocking block there is mounted a spirit level or bubble gauge 15.

The upper end of the vertically extending lever 12 carries a cross-head 16 the upper surface of which is curvilinear, as shown at 17. A rotatable shaft 19 extends through both the front plate 2 and the back plate 6 at a point which is immediately above the cross-head on the upper end of the vertically extending lever 12. The intermediate portion of the rotatable shaft 19 is provided with an integrally formed portion 20 of increased diameter which is adapted for rolling contact with the curvilinear upper surface 17 of the cross-head 16 on the upper end of the vertically extending lever 12.

Figure 3:
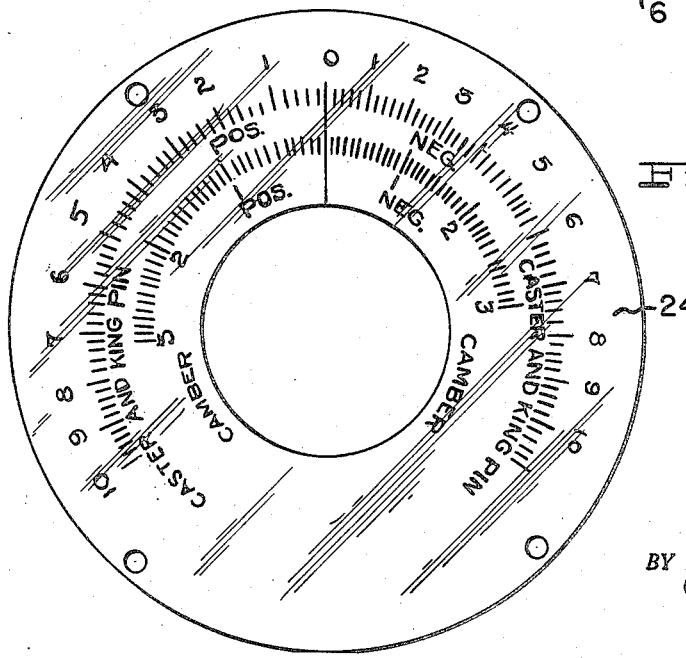
Figure 3 is an enlarged front elevation of the dial of the gauge which is highly calibrated and scribed in degrees and minutes for the purpose of accurately measuring angles of very small magnitude.

Referring to Figure 1, a round hub-member 22 is secured to the outer face of the front plate 2, as by screws 23, the axis of the said hub-member being coincident with the axis of the rotatable shaft 19. On the round hub-member 22 there is rotatably mounted a disk 24 the outer face of which is scribed to provide a dial which is highly calibrated in degrees and minutes, as shown in Figure 3. A transparent cover plate 26 overlies the rotatable disk dial 24 and is suitably secured thereto, whereby these two elements may be rotated as a unit.

The rotatable shaft 19 projects through the center of both the hub-member 22 and the transparent cover plate 26, and on its outer end receives a knob 27 which is secured in position by means of a set-screw (not shown). A pointer 28 is secured to that portion of the rotatable shaft 19 which lies between the hub-member 22 and the transparent cover plate 26, the said pointer overlying, and being adapted to cooperate with, the rotatable disk dial 24.

Immediately below its connection with the rotatable pin 10, the lower end of the vertically extending lever 12 is rounded, as shown at 30, and thereby adapted for frictional contact with the upper surface of a horizontally extending arm 32 which underlies the lower end of the said lever, and is pivotally connected, as at 33 to either the front plate and/or the back plate 6. The other end of the pivotally mounted horizontally extending arm 32 is spring-biased upwardly by a spring 34, thereby causing the rotatable pin 10 to move upwardly in its short slots and thus cause the curvilinear upper surface 17 of the cross-head 16 to engage the enlarged portion 20 on the rotatable shaft 19. Referring to Figure 5 of the drawings, the gauge of the invention is adapted for use with a clamp which comprises a rigid horizontal arm 35 which is adapted to extend longitudinally of the spindle of the front wheel of an automobile and to abut a face of the usual nut X on the outer end of the said spindle. Extending in parallelism with the rigid horizontal arm 35 is an arm 37 which is adapted to engage the opposite face of the nut X. This arm 37 is adjustably connected to the arm 35 by means of clamping bolts 38.

Referring to Figures 4 and 5, the outer end of the rigid horizontal arm 35 is provided with a yoke-shaped extension 40 within which there is pivotally connected an extension 41 the outer and extended end of which is round, as shown at 42 in Figure 5. According to this construction and arrangement the extension 41 may be set in line with the rigid horizontal arm 35 of the clamp or it may be turned to a 90 degree angle, as shown in Figure 4.

A depending swingable lever 44 is adapted to cooperate with the gauge clamp as hereinbefore described, the same comprising a bearing block 45 having a cylindrical aperture which is adapted to rotatably telescope over the round portion 42 of the extension 41 of the clamp. The lower end of the depending swingable lever 44 is provided with a counterweight 47. The depending swingable lever 44 is also provided with a pair of screw-heads 48 which are adapted to fit within keyhole slots 59 in the back plate 6 of the gauge.

Another form of attaching means for the gauge of the invention is illustrated in Figures 6 and 7 as comprising a bar 52 which is adapted to receive a pair of upper and lower sliding blocks 53 and 54, respectively, the same being held in adjusted position by means of set-screws 55. As shown in Figure 7, the upper sliding block 53 is provided with a pair of laterally extending fingers 56 which diverge outwardly with respect to each other, while the lower sliding block 54 carries a single laterally extending finger 57. The midportion of the bar 52 is provided on one of its wider faces with a pair of screw-heads for receiving and holding the back plate 6 of the gauge.

Caster

This is the backward or forward tilt of the spindle-supporting means. With the gauge attached to the depending swingable lever 44 the caster inclination of the spindle-supporting means (whether it be the pin type or the arms or brackets of independent springing) may be measured by setting the extension 41 of the clamp in line with the spindle and turning the wheel (mounted on the spindle) through an inward arc of 20 degrees and leveling the bubble gauge 15 by turning the knob 27 which moves the pointer 28. After leveling the bubble gauge 15 the rotatable dial 24 and its connected transparent cover plate 26 are turned until the dial is zeroed to the pointer 28. At this time the gauge is zeroed both as to level and dial to a position which is 20 degrees ahead of center. The wheel (which is mounted on the spindle) is now turned through an outward 40 degree arc from the forward position which is 20 degrees past the center position and toward the rear. At this point the gauge is again leveled by rotating knob 27. Now the amount of caster in degrees or minutes may be read on the highly calibrated dial under the pointer 28.

King pin inclination

This is the inclined angle of the spindle supporting means when said means (be it pins, arms, brackets, etc.) are in the line of, or point towards, the center of the tire at its point of contact with the road. It is determined in substantially the same manner as caster except that the extension 41 of the clamp is moved into a 90 degree angle with respect to the axis of the spindle.

Camber

This is the inclined angle or pitch of the wheels inwardly or outwardly and as such is a direct reading. In testing camber, I first check the wheel for a bent condition by raising it off the ground with a jack and then spinning the wheel to determine whether it runs true. After the wheel is lowered the bar 52 is placed in a vertical position with its two arms 56 making a two-point contact with the upper portion of the rim of the wheel and the single arm 57 making a single point contact with the lower portion of the rim. This arrangement is illustrated in Figure 6. The gauge body is mounted on the bar 52 (through the use of two screw-heads on the bar and the key-hole slots 59 in the back plate 6 of the gauge). Next, the rotatable dial 24 and its attached transparent cover 26 are rotated so that zero ("0") mark on the rim of the dial is aligned with a stationary pointer 60 which is mounted below the dial on the front plate 2. The gauge is now zeroed so that with the pointer 28 aligned with zero ("0") on the dial 24 any unlevel condition of the bubble gauge 15 will show the wheel to be out of plumb. Thus, by leveling the bubble gauge 15 the amount of camber may be read directly.

In order to set the gauge of the present invention so that it is zero or plumb with all dials at zero, the pointer 28 is turned three clockwise revolutions and one counterclockwise revolution. Then the pointer 28 is set directly on zero. At this point the gauge may be set either on a surface plate that is level or on a perpendicular bar that is plumb. If the level is "off" the bubble gauge 15 and its supporting rocking block 14 may be adjusted on the rotatable pin 18 until the bubble gauge zeros.

In addition to the foregoing uses, the gauge of the invention has other uses. For example, it may be used to measure the extent to which shims are to be employed in correction of the caster of vehicles having straight axles. By placing the gauge on a bench and zeroing it to the level of the bench the shims can be placed on that part of the bench to which the gauge is leveled; and then by placing the gauge atop the shim, the bubble gauge 15 may be leveled, and the correct extent of the necessary shimming is indicated on the dial 24.

While I have shown and described certain specific embodiments of the present invention, it will be readily understood that I do not wish to be limited exactly thereto, since various modifications may be made without departing from the scope of the invention as defined in the appended claims.

I claim:

1. A gauge for measuring the caster, camber and kingpin inclination of a vehicle wheel, comprising a base member, a dial mounted on said base member and at least partially rotatable with respect thereto, a rotatable element axially disposed with respect to said dial, a pointer secured to said rotatable element and adapted for registration with said dial, a rotatable element carried by said base member and disposed in spaced parallelism with respect to said first-named rotatable element, a bubble gauge secured to said last-named rotatable element, a lever extending between said rotatable elements, one end of said lever being secured to said last-named rotatable element, a cross-head carried by the other end of said lever, said cross-head extending transversely of said base member and providing a curvilinear trackway, and resilient means for influencing said curvilinear trackway into contact with said first-named rotatable element.

2. A gauge for measuring the caster, camber and kingpin inclination of a vehicle wheel, comprising a base member, a dial mounted on said base member and at least partially rotatable with respect thereto, said dial being calibrated in both clockwise and counter-clockwise directions, a rotatable element axially disposed with respect to said dial, a pointer secured to said rotatable element and adapted for registration with said dial, a rotatable element carried by said base member and disposed in spaced parallelism with respect to said first-named rotatable element, a bubble gauge secured to said last-named rotatable element, a lever extending between said rotatable elements, one end of said lever being secured to said last-named rotatable element, a cross-head carried by the other end of said lever, said cross-head extending transversely of said base member, and providing a curvilinear trackway, and resilient means for influencing said curvilinear trackway into contact with said first-named rotatable element.

3. A gauge for measuring the caster, camber and kingpin inclination of a vehicle wheel, comprising a base member, a dial mounted on said base member and at least partially rotatable with respect thereto, a rotatable element axially disposed with respect to said dial, a pointer secured to said rotatable element and adapted for registration with said dial, said base member having a slot extending toward said rotatable element, a rotatable element disposed in and projecting from said slot, a bubble gauge secured to said last-named rotatable element, a lever extending between said rotatable elements, one end of said lever being secured to said last-named rotatable element, a cross-head carried by the other end of said lever, said cross-head extending transversely of said base member and providing a curvilinear trackway, and resilient means for influencing said lever toward said first-named rotatable element whereby said curvilinear trackway may contact said first-named rotatable element.

4. A gauge for measuring the caster, camber and kingpin inclination of a vehicle wheel, comprising a base member, a dial mounted on said base member and at least partially rotatable with respect thereto, said dial being calibrated in both clockwise and counter-clockwise directions, a rotatable element axially disposed with respect to said dial, a pointer secured to said rotatable element and adapted for registration with said dial, said base member having a slot extending toward said rotatable element, a rotatable element disposed in and projecting from said slot, a bubble gauge secured to said last-named rotatable element, a lever extending between said rotatable elements, one end of said lever being secured to said last-named rotatable element, a cross-head carried by the other end of said lever, said cross-head extending transversely of said base member and providing a curvilinear trackway, and resilient means for influencing said lever toward said first-named rotatable element whereby said curvilinear trackway may contact said first-named rotatable element.

BERNARD J. BECKWITH.

REFERENCES CITED

The following references are of record in the file of this patent:

UNITED STATES PATENTS

| Number | Name | Date |
|---|---|---|
| 775,483 | Whitehouse | Nov. 22, 1904 |
| 1,804,490 | Bagge | May 12, 1931 |
| 2,171,616 | Wilkerson | Sept. 5, 1939 |
| 2,232,689 | Breihan | Feb. 25, 1941 |
| 2,234,436 | King | Mar. 11, 1941 |
| 2,295,184 | Sandbo | Sept. 8, 1942 |
| 2,423,317 | Holton | July 1, 1947 |